United States Patent [19]

Partlow et al.

[11] Patent Number: 5,683,528
[45] Date of Patent: Nov. 4, 1997

[54] METHOD FOR MANUFACTURING A LOW LOSS, LOW TEMPERATURE COFIRED CERAMIC

[75] Inventors: Deborah P. Partlow, Pittsburgh; Stephen R. Gurkovich, Penn Hills; Kenneth C. Radford, North Huntingdon, all of Pa.; Andrew J. Piloto, Columbia, Md.

[73] Assignee: Northrop Grumman Corporation, Los Angeles, Calif.

[21] Appl. No.: 460,953

[22] Filed: Jun. 5, 1995

Related U.S. Application Data

[63] Continuation-in-part of Ser. No. 96,235, Jul. 26, 1993, abandoned.

[51] Int. Cl.$^6$ ............................................. C04B 37/00
[52] U.S. Cl. ........................... 156/89; 264/61; 423/338; 423/339; 501/12
[58] Field of Search ........................... 156/89; 264/61; 501/12; 423/338, 339

[56] References Cited

U.S. PATENT DOCUMENTS

| | | | |
|---|---|---|---|
| 4,642,148 | 2/1987 | Kurihara et al. | 156/89 |
| 4,764,357 | 8/1988 | Sherif et al. | 501/12 |
| 4,883,521 | 11/1989 | Shimizu et al. | 501/12 |
| 4,936,317 | 6/1990 | MacGregor | 128/784 |
| 4,943,425 | 7/1990 | Su et al. | 423/338 |
| 4,978,640 | 12/1990 | Kelly | 501/32 |
| 5,128,284 | 7/1992 | Olson et al. | 501/12 |
| 5,175,199 | 12/1992 | Asano et al. | 523/444 |

OTHER PUBLICATIONS

M.D. Sacks et al., "Preparation of SiO$_2$ Glass from Model Powder Compacts: I, Formation and Characterization of Powders, Suspensions, and Green Compacts", *J. Am. Ceram. Soc.*, 67[8], pp. 526–532 (1984).

M.D. Sacks et al., "Preparation of SiO$_2$ Glass from Model Powder Compacts: II, Sintering," *J. Am. Ceram. Soc.*, 67[8] pp. 532, 537 (1984).

Yoldas, B.E., "Preparation of Glasses and Ceramics from Metal–Organic Compounds", J. Mat. Sc., 12, 1203 (1977).

L. E. Sanchez, "Electrical, Mechanical and Thermal Characterization of a Cofired, Multilayer Substrate Processed From Sol–Gel Silica", *Ceram. Eng. Sci. Proc.* 9 [11–12] pp. 1590–1602 (1988).

C. Frondel, *The System of Mineralogy: vol. III Silica Minerals*, "Cristobalite", John Wiley & Sons, Inc. New York, p. 273 (1962).

Yoldas, B.E., "Preparation of Glasses and Ceramics from Metal–Organic Compounds", J. Mat. Sc., 12, 1203 (1977).

*Primary Examiner*—Christopher A. Fiorilla
*Attorney, Agent, or Firm*—Walter G. Sutcliff

[57] ABSTRACT

A method for forming a low temperature cofired ceramic package which is made using a multi-layered densified spherical powder formed via a sol-gel process. This densified powder is formed from layers of SiO$_2$ reacted with trimethyl borate. The spherical powder has a preselected particle size and boron content sufficient to render the low temperature cofired ceramic package fully dense, even in the presence of a second phase filler ceramic, at a sintering temperature below 1000° C. Binder material is added to the spherical powder and ceramic filler to form a plurality of tapes. A ceramic assembly is then formed by layering the plurality of tapes upon one another and firing the ceramic assembly at a temperature below 1025° C. to form a fully dense cofired ceramic package. In order to form the multi-layered densified spherical powder, a silica core, which is formed using a sol-gel process, is reacted with trimethyl borate. An additional layer of silica is provided upon the reacted product which, in turn, is reacted with trimethyl borate. This process is continued until a spherical powder of desired size is formed.

5 Claims, 3 Drawing Sheets

FIG.1
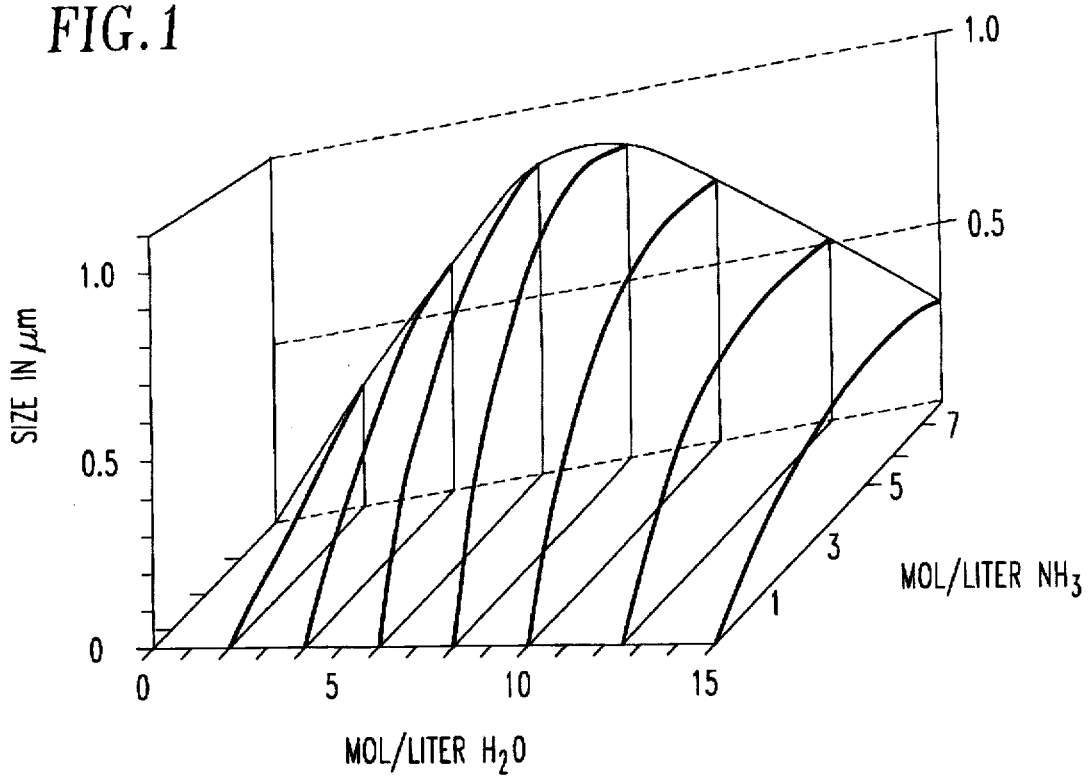
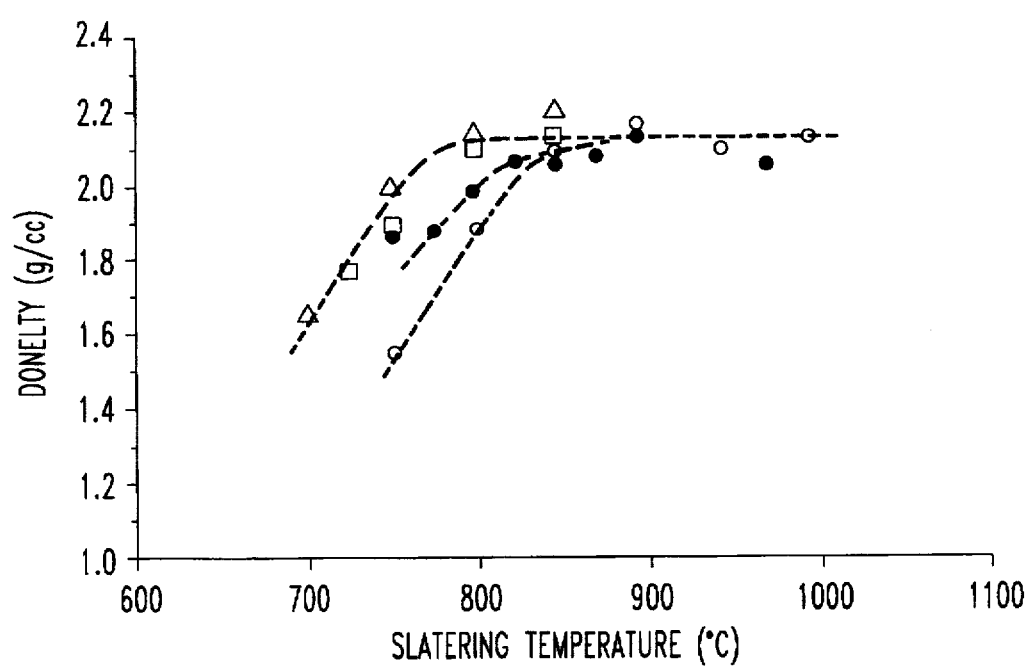
FIG.2a

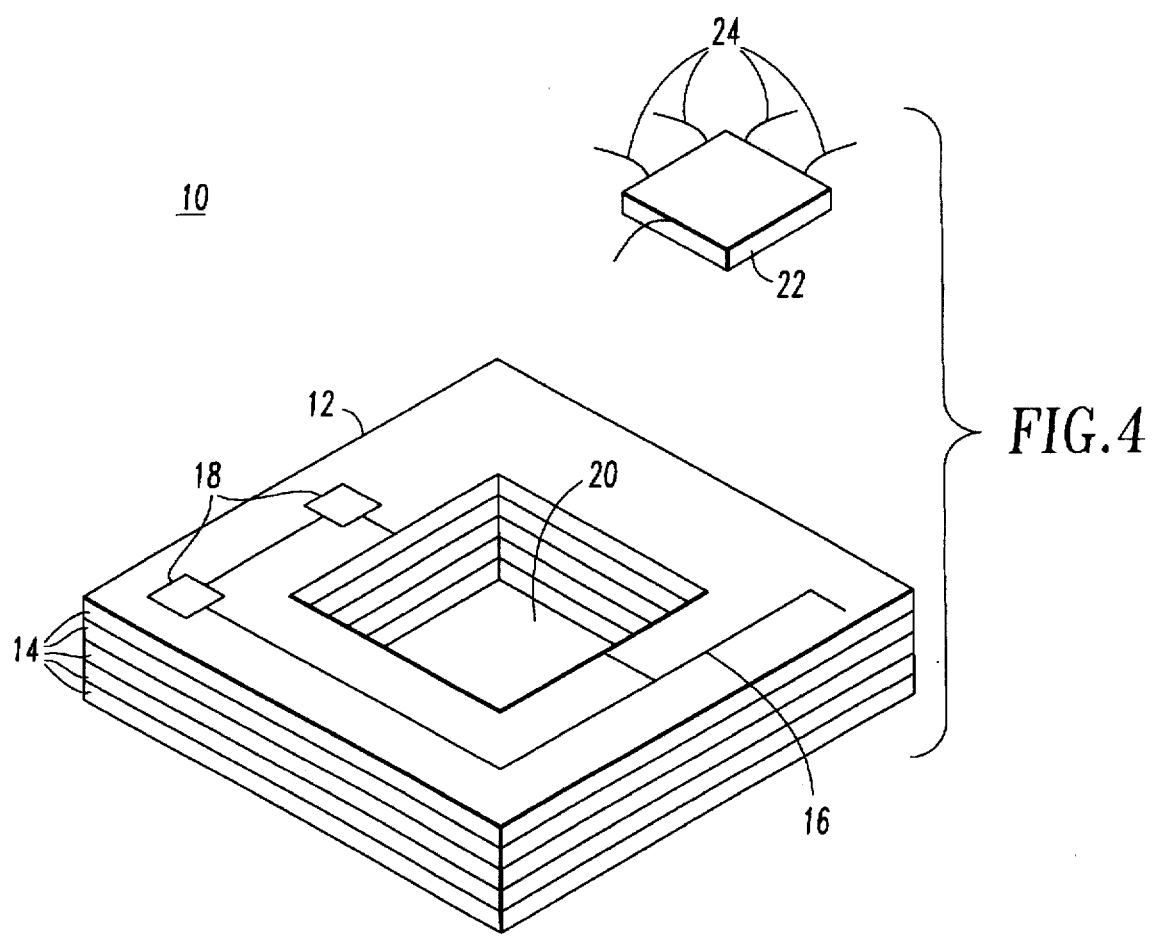

METHOD FOR MANUFACTURING A LOW LOSS, LOW TEMPERATURE COFIRED CERAMIC

This application is a continuation-in-part of application Ser. No. 08/096,235, filed Jul. 26, 1993 now abandoned.

BACKGROUND OF THE INVENTION

1. Field of the Invention

This invention relates to the field of low-temperature cofired ceramic substrates and, in particular, to low-temperature cofired ceramic substrates used in RF/microwave packaging applications. More particularly, this invention relates to the production of a multi-layer ceramic powder suitable for fabrication into ceramic electronic packages.

2. Description of the Prior Art

Low-temperature cofired ceramic (LTCC) substrates are customarily used in high-end digital applications such as RF/microwave packaging units. Such substrates are needed because the commercially available ceramic packages had been developed mostly for digital applications, and their dielectric properties in the microwave range are marginal. The advancement in semiconductor and supporting electronic technology has progressed to the point that, in some cases, the performance of an electronic microwave system is limited by the available packaging materials.

In co-pending application Ser. No. 08/096,235, filed Jul. 26, 1993, hereby incorporated by reference, a method for forming a low temperature cofired ceramic is described in which the sol-gel method is used to make fine powders that have very active surfaces. The active surfaces allow the powders to densify at temperatures far below those needed to densify conventional powders. These powders are packed in the unfired state and mixed with organic binders and plasticizers to form the ceramic tape. High unfired ceramic density is more readily achieved if the powder particles are spherical and uniform in size.

It is known that submicron silica spheres can be produced using the sol-gel process. The spheres can be formed having a very uniform size, which is determined by the amounts of chemical constituents used. The use of such spheres produced using the sol-gel process reduces the sintering temperature of the silica substrate by hundreds of degrees. The uniformity of the size of the spherical particles made by the sol gel process allows uniform and high density packing of the particles in the tape. This results in uniform and reproducible shrinkage tolerance in the fired, monolithic substrate and package. Because the tape is made by the sol-gel process, it is of very high purity, which minimizes dielectric losses.

Pure silica is a low-loss glass. Small additions of boron can improve the sinterability of silica tapes and allow the tapes to be densified at low temperatures while maintaining a loss tangent of as low as $2 \times 10^{-4}$. To make the method practical, particle sizes of or below approximately 0.45 micron are required to achieve densification of formed articles by sintering at or below 1000° C. It is necessary to achieve densification at or below 1000° C. in order to provide a margin of error sufficiently distant from the melting point of gold at 1060° C. The particle size of the spheres is controlled by limiting the ammonium hydroxide and water of the alcohol bath in which the spheres are precipitated. In addition, increased boron content improves the sinterability of spherical powders.

Silica glass has an extremely low thermal expansion coefficient of 0.5 parts per million per degree Celsius. Fabrication of electronic packages requires attachment of devices (chips) of silicon and/or gallium arsenide, which have higher thermal expansion coefficients. Close matching of the expansion of the substrate/package with the chip is essential for high reliability of the electronic system. The thermal expansion coefficient of the substrate/package made by the sol-gel process can be controlled to match that of the chip using mixtures of glass and crystals in appropriate ratios.

There are two ceramic components in the final fired package: ground crystalline quartz, and a special low-loss glass formed from silica and boron. The thermochemical properties of the glass are critical to achieving a dense package while maintaining good electrical properties. It has also been found that the addition of quartz to borosilicate glass can equalize the thermal expansion coefficient of the electronic package and the electronic device, e.g., silicon or gallium arsenide. However, as the amount of quartz is increased, the amount of boron needed for densification of the electronic package increases to a level that the borosilicate glass can no longer be formed by a simple version of the sol gel process. Accordingly, there is a need for a special sol gel process for manufacturing this special low-loss glass. The simultaneous achievement of ultra-low loss tangent, tailorable thermal expansion via quartz additions, and full densification below the melting point of gold are not possible using any known process or combination of processes. Low dielectric constant, another desirable feature for electronic packages, also results from the choice of borosilicate glass and quartz as constituents.

SUMMARY OF THE INVENTION

A method for producing a multi-layer ceramic powder using a sol-gel precipitation process is provided in which the powder is suitable for fabrication into ceramic electronic packages having a low dielectric constant and a very low loss tangent. The powder is able to densify at temperatures that are compatible with the use of high conductivity metallizations such as gold, silver, and copper.

In the present method, a spherical core is formed and its surface is reacted with a desired amount of trimethyl borate. After a second layer of silica is added to the core, the core ms again reacted with a desired amount of trimethyl borate. This process is repeated until the desired spherical multi-layer structure is built. This multi-layer structure is then used to provide the active powder for the fabrication of tapes for electronic package applications as disclosed in patent application Ser. No. 08/096,235, filed Jul. 26, 1993, hereby incorporated herein.

BRIEF DESCRIPTION OF THE DRAWINGS

FIG. 1 is a graph showing the control of silica sphere size by regulation of ammonia and water content.

FIG. 2a is a graph showing the effect of boria content on the temperature of densification of glasses.

FIG. 4 is a schematic illustration of a ceramic electronic package produced using a presently preferred embodiment of the powder of the present invention.

DETAILED DESCRIPTION OF PREFERRED EMBODIMENT

Figure 2B:
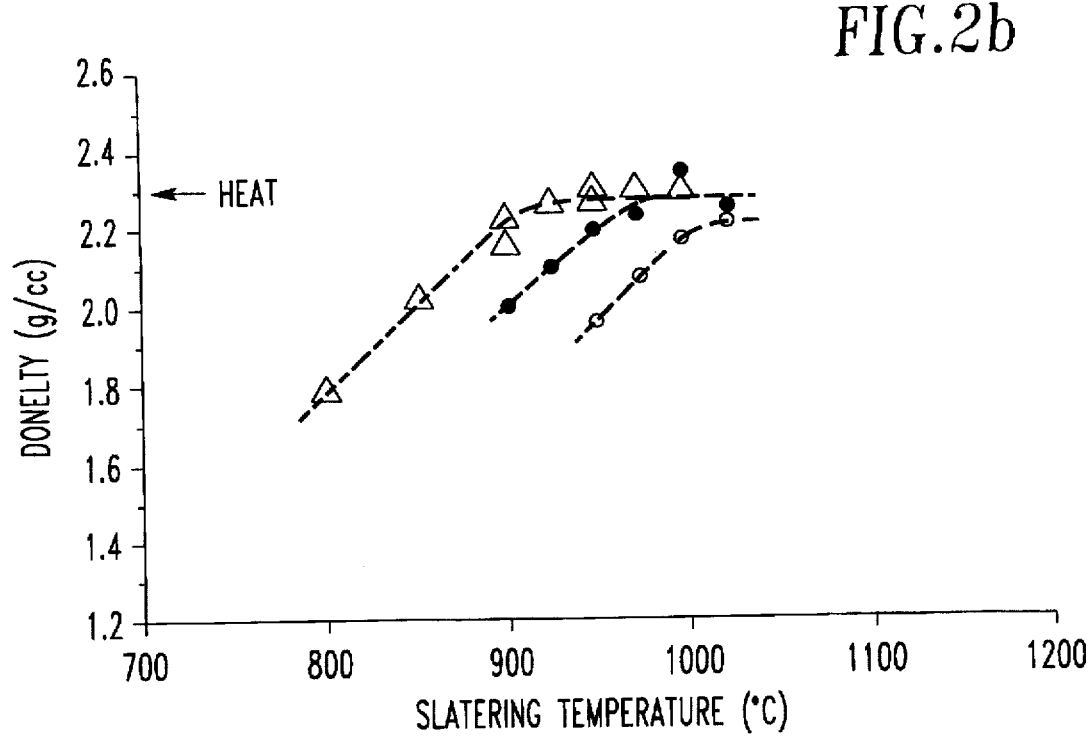
FIG. 2b is a graph showing the effect of quartz content on the temperature of densification of glasses.
Figure 3:
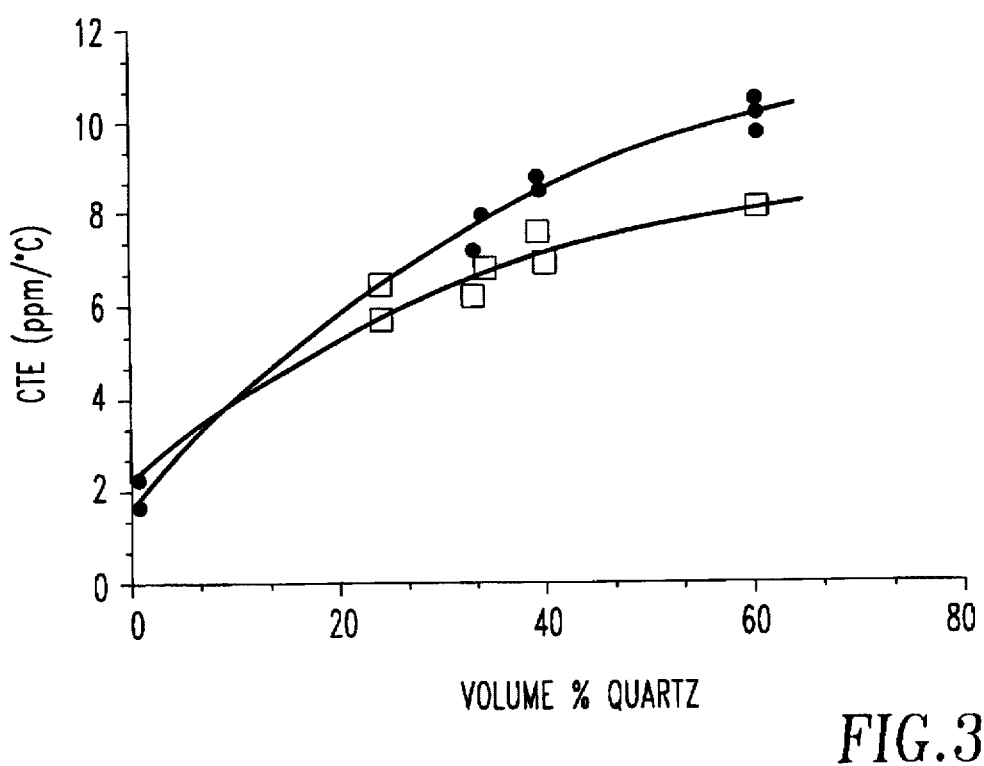
FIG. 3 is a graph showing the effect of quartz content on the thermal expansion coefficient of a ceramic.

In the present invention, a unique sol-gel precipitation process is used to obtain a very small diameter, uniform spherical powder whose composition is based on silica ($SiO_2$) and boria ($B_2O_3$). This composition provides a low dielectric constant, while the high purity attainable with the sol-gel method ensures a low-loss tangent.

A sol-gel process for making silica spheres from tetraethylorthosilicate (TEOS) has long been known. In this process, TEOS is added to a solution of alcohol-containing water and ammonium hydroxide. By regulating the concentration of water and ammonia, the size of the silica spheres can be controlled, as shown in FIG. 1. This method was subsequently used by Chamois et al. in U.S. Pat. No. 4,883,521 in a process which incorporated two sizes of silica spheres that were closely packed by settling from a liquid suspension and subsequently heated to 1400° C. to form a pure silica glass.

The incorporation of small amounts of elements (other than silica) as dopants can be accomplished by adding organometallic compounds containing the desired cation. Depending on the relative rates of hydrolysis of the TEOS and the dopant organometallic compound, the dopant might be chemically attached via oxygen to the silicon ion as are the components in a glass made by melting, i.e., Si—O—M. This concept, a form of chemical polymerization, is described in Yoldas, "Preparation of Glasses and Ceramics from Metal-Organic Compounds", *J.Mat.Sci.*, 12, 1203 (1977). Alternatively, a separate fine powder phase containing the dopant might coprecipitate with the silica spheres, particularly if the cation is added as a salt.

In Sacks, "Preparation of $SiO_2$ Glass From Model Powder Compacts: I, Formation And Characterization Of Powders, Suspensions, And Green Compacts", *Journal of the American Ceramic Society*, 67, 526 (1984), 2% boron oxide was added to spherical silica powder to obtain dense glass at 1050° C. However, this material exhibited uncontrollable thermal expansion. Independent experiments have confirmed that Sacks' method produces a variable amount of crystallized silica (cristobalite) which alters the thermal expansion and the mechanical properties of the resulting material. In fact, if the cristobalite content is increased by prolonged heating or heating to higher temperatures, the desired thermal expansion that matches semiconductor chips can be attained. Unfortunately, such high amounts of cristobalite cause the ceramic to crumble, because cristobalite exhibits a sudden destructive change in crystal structure when passing through the temperature range of approximately 273° C. Thus, Sacks' method cannot be used for the production of electronic substrates or any other application requiring thermal expansions above about 2 ppm/° C.

For the present invention, it is desirable to add boron to the silica to create a borosilicate glass composition. Trimethyl borate ($B(OCH_3)_3$) (TMB) can be used as a convenient chemical to use for the addition of the boron, because it is an organometallic liquid that is available at a reasonable cost and very high purity. The borosilicate composition is expected to display low dielectric constant, because silica and boria are both low in dielectric constant. The loss tangent should be low because of the high purity possible with sol-gel-derived materials, and the densification temperature should be low because of the well-known fluxing action of boron on silica glass. To allow use of a ceramic electronic package with gold metallization, the densification temperature of the ceramic should be about 1000° C. or lower, because gold melts at 1063° C. A boron content of 8% equivalent $B_2O_3$ was experimentally shown to promote densification of the borosilicate glass at such temperatures.

The thermal expansion of borosilicate glasses is too low for the mounting of gallium arsenide devices. Accordingly, a 35 volume % crystalline quartz filler is necessary to achieve a thermal expansion match with GaAs. The addition of quartz as a filler tends to oppose densification, requiring a much higher boron content in the glass to achieve a dense product when firing at temperatures below 1000° C. FIGS. 2a and 2b illustrate this concept.

The addition of high amounts of trimethyl borate to the spherical silica process is problematic. If the trimethyl borate is added along with the TEOS, silica spheres do not readily form, and the surface area and boron content of the resulting material may be uncontrollable. If the silica spheres are first formed and the trimethyl borate added subsequently, then the amount of boron taken up by the powder is limited to 12 to 17% equivalent $B_2O_3$, because the attachment sites for the boron are limited, and because trimethyl borate has a finite solubility in the precipitation bath. Even when copious amounts of excess trimethyl borate are added, this problem may persist.

It was experimentally determined that ceramic packages made using powder containing 17% $B_2O_3$ did not densify reproducibly after heating for as long as 9 hours at 980° C., which is unacceptable for electronic packaging production. Our experience showed that $B_2O_3$ contents of 19% by weight of the glass were necessary to reliably produce dense ceramic packages at temperatures below 1000° C. using borosilicate glass and a crystalline filler, when the crystalline filler was present in amounts as low as 15 volume %.

The present method incorporates the desired amount of boron in a reproducible manner by producing a multilayered powder having at least three layers each of silica and boria. First a small spherical core is formed, and its surface is reacted with one third of the desired amount of trimethyl borate. Then a second layer of silica is added, and so on, until the desired spherical multilayered structure is built up. Although a wide range of particle diameters can be achieved via this procedure, submicron particles are used to provide the desired active powders for the fabrication of tapes for electronic packaging applications, and powders in the 0.33 micron range are preferred. The order of the boria and silica additions affects the outcome, as powders in which TEOS is the final addition produce brittle tape.

Tape is an intermediate, flexible product containing the ceramic powders and organic binders. The tape is cut, punched, metallized, and then stacked in layers to build up a three-dimensional ceramic electronic package as illustrated in FIG. 4. After firing, only the metal and ceramic are left, and the product sinters to a monolithic high-density body.

FIG. 4 shows an electronic module 10 having an electronic package 12 formed from a plurality of layers of tape 14. Conductor patterns such as surface conductor 16 are provided on each layer of tape 14 and interconnections or vias are provided between layers 14. Surface mounted components 18, such as capacitors, resistors and the like are mounted on the surface of the upper tape layer 14 in connection with surface conductor 16. In order to complete the electronic module 10, a cavity 20 may be provided in electronic package 12. Cavity 20 does not completely penetrate package 12. Cavity 20 receives an electronic chip device 22 formed from silicon, gallium arsenide, silicon carbide or the like. Electronic device 22 is provided with wires 24 which provide connection to surface conductor 16. Alternatively, electronic device 22 may be placed on the surface of electronic package 12.

EXAMPLE

The procedure used to form a multilayered structure in accordance with the present invention is set forth below.

1. 3452 grams of high purity ethyl alcohol are added to a closed polypropylene reactor equipped with a teflon stirring bar and a temperature control. The liquid is then heated to 40° C.

2. 132 grams of high-resistivity deionized water are added to the alcohol and mixed by continued stirring.

3. 217 grams of electronic grade ammonium hydroxide (concentration approximately 28% in water) are then added to the mixture.

4. After the temperature returns to 40° C., 38.7 grams of tetraethylorthosilicate are added. After one hour, the solution appears milky, signifying that the silica spheres have formed. Because of the low ammonia concentration, the spheres are small, about 0.1 micron in diameter.

5. 20 grams of trimethyl borate are added and allowed to react for one hour.

6. The TEOS and TMB additions are repeated two additional times to complete the multilayered structure.

The resulting spherical powder is recovered by filtering, dried at 100° C. overnight, and calcined at 300° C. for 16 hours to remove organics. This material is then ready to combine with a crystalline filler if required for thermal expansion tailoring. The ceramic powders are subsequently mixed with solvents, binders and other additives to process into a ceramic tape, which is in turn made into a ceramic electronic package.

The powders formed in accordance with the present invention include a plurality of boron-oxide doped silica particles. These particles are generally spherical and have a particle size less than about 0.45 micron. These particles have a densification temperature less than about 1000° C., a loss tangent less than about $5 \times 10^{-4}$, and a coefficient of thermal expansion between about 2.3 ppm/° C. and about 10 ppm/° C.

The packages produced using the powder of the present invention enhance the performance of electronic systems in which they are utilized, providing short delay times and high signal-to-noise ratios. Other ceramic powders with equivalent electrical properties will only densify by heating to temperatures far above the melting points of the desired metallizations. Other lower-temperature ceramics display higher loss tangents at conventional frequencies, and their losses rise dramatically at frequencies above approximately 25 GHz; these cannot be used at high frequencies. Such high frequencies are needed for improved resolution in imaging systems.

In the foregoing specification certain preferred practices and embodiments of this invention have been set out, however, it will be understood that the invention may be otherwise embodied within the scope of the following claims.

We claim:

1. A method for forming a low temperature cofired ceramic comprising the steps of:

a. forming a multi-layered densified spherical powder, said densified powder formed primarily from layers of $SiO_2$ formed using a sol gel process, each of said layers being reacted with a chemical selected from the group consisting of trimethyl borate and other boron containing reactants, said spherical powder having an equivalent boria content of at least 10% by weight;

b. adding binder material to said spherical powder and forming a plurality of tapes from said spherical powder having binder material added thereto;

c. forming a ceramic assembly by layering said plurality of tapes upon one another; and d. firing said ceramic assembly at a temperature below 1025° C. to form a fully dense cofired ceramic, said cofired ceramic having a borosilicate matrix.

2. The method of claim 1 wherein a powdered crystalline ceramic filler is added to said spherical powder.

3. The method of claim 2 wherein said powdered crystalline ceramic filler is quartz.

4. The method of claim 3 wherein said spherical powder has an equivalent boria content of at least approximately 19% by weight.

5. The method of claim 1 wherein said multilayered densified spherical powder is formed by a process comprising the steps of:

a. producing a silica core using a sol-gel process;

b. reacting said silica core with trimethyl borate to form an intermediary borosilicate sphere;

c. adding at least one layer of silica upon said intermediary borosilicate sphere; and d. reacting said at least one layer of silica with trimethyl borate to form a borosilicate sphere.

* * * * *